United States Patent
Armstrong et al.

(10) Patent No.: US 7,039,820 B2
(45) Date of Patent: May 2, 2006

(54) METHOD FOR DETECTING AND POWERING OFF UNUSED I/O SLOTS IN A COMPUTER SYSTEM

(75) Inventors: Troy David Armstrong, Rochester, MN (US); Curtis Shannon Eide, Rochester, MN (US); Jeffery David Haumont, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 10/422,679

(22) Filed: Apr. 24, 2003

(65) Prior Publication Data
US 2004/0215985 A1 Oct. 28, 2004

(51) Int. Cl.
*G06F 1/32* (2006.01)
(52) U.S. Cl. ...................... 713/324; 713/320
(58) Field of Classification Search ............... 713/320, 713/324
See application file for complete search history.

(56) References Cited

U.S. PATENT DOCUMENTS

| | | | | |
|---|---|---|---|---|
| 4,747,041 | A * | 5/1988 | Engel et al. ................. | 713/324 |
| 5,371,867 | A | 12/1994 | George et al. | |
| 5,423,046 | A * | 6/1995 | Nunnelley et al. .......... | 713/330 |
| 5,655,146 | A | 8/1997 | Baum et al. | |
| 5,708,790 | A | 1/1998 | White et al. | |
| 5,721,858 | A | 2/1998 | White et al. | |
| 5,875,310 | A * | 2/1999 | Buckland et al. ........... | 710/309 |
| 6,243,817 | B1 * | 6/2001 | Melo et al. .................. | 713/300 |
| 6,247,109 | B1 | 6/2001 | Kleinsorge et al. | |
| 6,279,046 | B1 | 8/2001 | Armstrong et al. | |
| 6,332,180 | B1 | 12/2001 | Kauffman et al. | |
| 6,381,682 | B1 | 4/2002 | Noel et al. | |
| 6,542,926 | B1 | 4/2003 | Zalewski et al. | |
| 6,633,916 | B1 | 10/2003 | Kauffman | |

(Continued)

FOREIGN PATENT DOCUMENTS

EP  0 917 056 A2  5/1999

(Continued)

OTHER PUBLICATIONS

Kenneth Mason, "Method for Interlocked Deferred Partition Reset in a Logical Partitioning Environment," International Business Machines Corporation, Research Disclosure, vol. 458, No. 152, Jun. 2002, ISSN 0374-4353.

(Continued)

*Primary Examiner*—Chun Cao
(74) *Attorney, Agent, or Firm*—Joan Pennington

(57) ABSTRACT

A method, apparatus and computer program product are provided for detecting and powering off unused I/O slots in a computer system. For each of the I/O slots, the current slot is checked to determine if the slot is powered on and unlocked. When the current slot is powered on and unlocked, the current slot is checked to determine if the current slot is a candidate for being powered off. When the current slot is determined to be a candidate for being powered off, then the current slot is powered off and the checking continues with a next one of the I/O slots. Recording the slot as a candidate for being powered off before the slot is actually powered off ensures a proper delay to avoid powering off a slot that is about to be locked, which could cause slot power cycles in quick succession.

18 Claims, 5 Drawing Sheets

U.S. PATENT DOCUMENTS

| | | | |
|---|---|---|---|
| 6,678,831 B1 * | 1/2004 | Mustafa et al. | 713/320 |
| 6,748,546 B1 * | 6/2004 | Mirov et al. | 713/320 |
| 6,760,852 B1 * | 7/2004 | Gulick | 713/324 |
| 6,795,930 B1 * | 9/2004 | Laurenti et al. | 713/324 |
| 6,910,142 B1 * | 6/2005 | Cross et al. | 713/324 |
| 6,959,399 B1 * | 10/2005 | King et al. | 714/6 |
| 2002/0161869 A1 | 10/2002 | Griffin et al. | |
| 2002/0161891 A1 | 10/2002 | Higuchi et al. | |
| 2003/0041090 A1 | 2/2003 | Armstrong et al. | |
| 2004/0111596 A1 * | 6/2004 | Rawson, III | 713/1 |
| 2004/0181625 A1 * | 9/2004 | Armstrong et al. | 710/200 |
| 2004/0181657 A1 * | 9/2004 | Armstrong et al. | 713/1 |

FOREIGN PATENT DOCUMENTS

JP         362217314   * 9/1987

OTHER PUBLICATIONS

U.S. Appl. No. 10/388,350 "Apparatus and Method for Controlling Resource Transfers in a Logically Partitioned Computer System," Troy David Armstrong et al., filed Mar. 13, 2003 (ROC920020175US1).

U.S. Appl. No. 10/388,087, "Apparatus and Method for Controlling Resource Transfers in a Logically Partitioned Computer System," Troy David Armstrong et al., filed Mar. 13, 2003 (ROC920030053US1).

* cited by examiner

METHOD FOR DETECTING AND POWERING OFF UNUSED I/O SLOTS IN A COMPUTER SYSTEM

FIELD OF THE INVENTION

The present invention relates generally to the data processing field, and more particularly, relates to a method, apparatus and computer program product for detecting and powering off unused input/output (I/O) slots in a computer system including a logically partitioned computer system.

DESCRIPTION OF THE RELATED ART

Low power consumption by computer systems and components is a selling point for computers because it saves customers money through lower utility bills and less machine room cooling equipment.

On some known logically partitioned computer systems, I/O slots with adapters in them or occupied I/O slots are powered on automatically by the hardware when the enclosure, or power domain, in which the slots reside goes through a Power-On-Reset (POR), that is when the enclosure or power domain powers on.

Some known computer systems that support logical partitioning do not attempt to power off unused I/O slots. Rather, occupied I/O slots remain powered on as long as the platform is powered on, regardless of whether the I/O slots are being used or not. Powering these I/O slots takes more power and costs the customer more money.

On a logically partitioned system there are well defined and platform controlled situations where I/O adapters are not being used for extended periods of time. One example is when an I/O slot is not assigned to a logical partition. Another example is when the logical partition to which an I/O slot is assigned is powered off.

A need exists for a mechanism for detecting and powering off unused I/O slots in a logically partitioned computer system.

SUMMARY OF THE INVENTION

A principal object of the present invention is to provide a method, apparatus and computer program product for detecting and powering off unused I/O slots in a computer system. Another important object of the present invention is to provide such method, apparatus and computer program product for detecting and powering off unused I/O slots substantially without negative effect and that overcomes some of the disadvantages of prior art arrangements.

In brief, a method, apparatus and computer program product are provided for detecting and powering off unused I/O slots in a computer system including a logically partitioned computer system. For each of the I/O slots, the current slot is checked to determine if the slot is powered on. Responsive to the current slot being powered on, the current slot is checked to determine if the slot is unlocked. Responsive to the current slot being unlocked, the current slot is checked to determine if the current slot is a candidate for being powered off. Responsive to the current slot being unlocked and being a candidate for being powered off, the current slot is powered off and checking continues with a next one of the I/O slots.

In accordance with features of the invention, when the current slot is unlocked and is not already a candidate for being powered off, then the current slot is recorded as being a candidate for being powered off. Then checking continues with a next one of the I/O slots. Recording the slot as a candidate for being powered off and then repeating an iteration of checking the I/O slots before the candidate slot is powered off ensures a proper delay occurs before the slot is actually powered off and avoids powering off a slot that is about to be locked, which could cause slot power cycles in quick succession.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENT

In accordance with features of the preferred embodiment, unused I/O slots are powered off automatically. A method is provided to continuously monitor for and detect I/O slots that are not needed on a logically partitioned computer system so that unneeded I/O slots can be powered off. First an unused slot is recorded as a candidate for being powered off, then a delay occurs before the candidate slot is actually powered off to avoid otherwise possible slot power cycles in quick succession.

Figure 1:
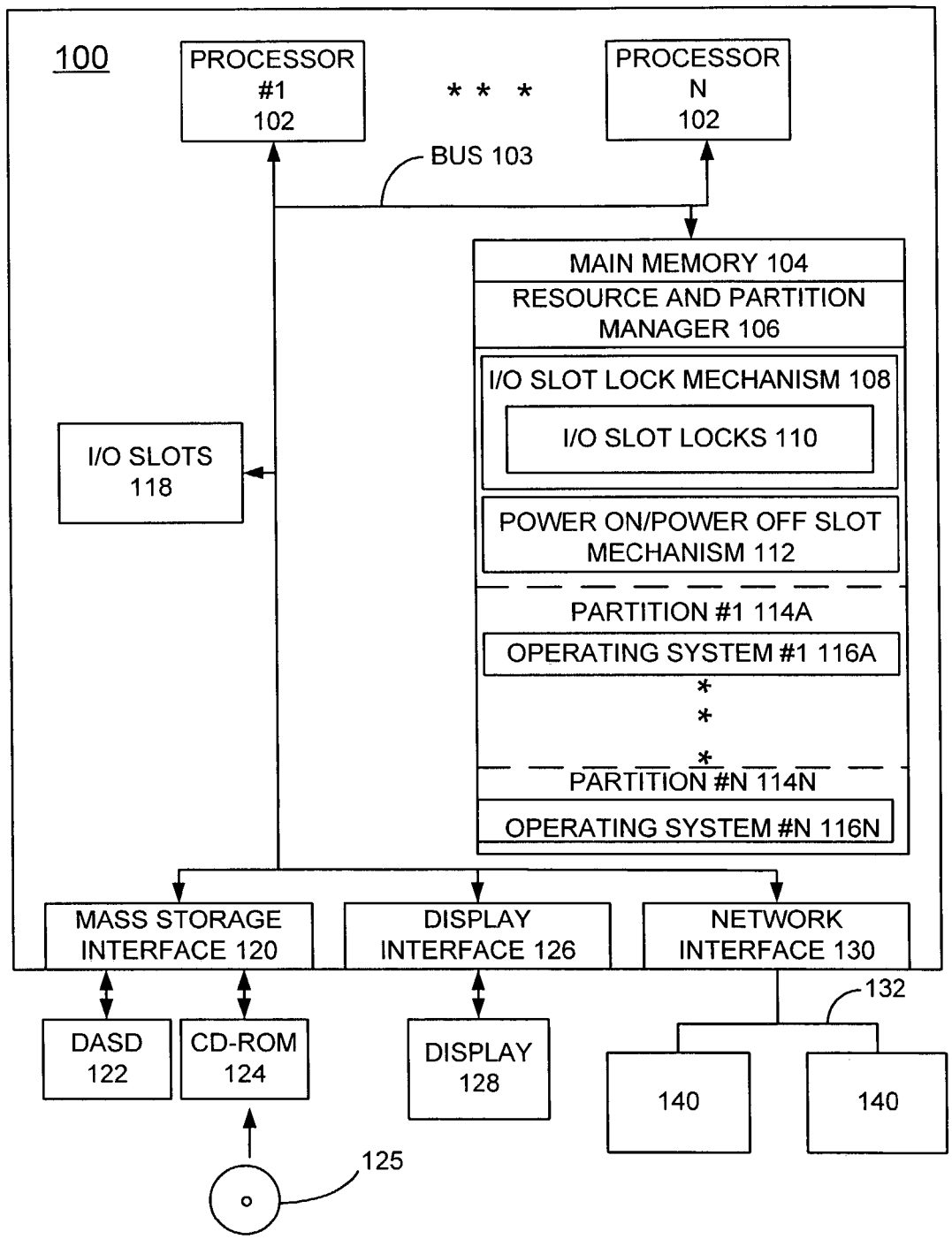
FIG. 1 is a block diagram illustrating a logically partitioned computer system for implementing methods for detecting and powering off unused I/O slots in accordance with the preferred embodiment.

Referring now to the drawings, in FIG. 1 there is shown a logically partitioned computer system generally designated by the reference character 100 for implementing methods for detecting and powering off unused I/O slots in accordance with the preferred embodiment. Computer system 100 includes a plurality of main processors 1-N, 102 coupled by a system bus 103 to a system memory 104 including a resource and partition manager 106, an I/O slot lock mechanism 108, I/O slot locks 110, a power on/power off slot mechanism 112, and partitions 1-N, 114 together with respective operating systems 1-N, 116. A plurality of I/O slots 118 is connected to the system bus 103. A mass storage interface 120 coupled to the system bus 103 connects a direct access storage device (DASD) 122 and a CD-ROM drive 124 to the main processor 102 and the system memory 104. A separate recording media 125, such as a floppy disk, a high capacity read only memory in the form of an optically read compact disk or CD-ROM is shown that contains, for example, a computer program product for carrying out methods of the preferred embodiment. Computer system 100 includes a display interface 126 connected to a display 128, and a network interface 130 coupled to the system bus 103. A local area network (LAN) or wide area network (WAN) 132 connected to the network interface 130 couples I/O devices 140, such as a personal computer to the computer system 100.

Computer system 100 is shown in simplified form sufficient for an understanding of the invention. Computer system 100 can be implemented with various computers, for example, with one of the IBM eServer line of computers manufactured by International Business Machines Corporation. It should be understood that the present invention applies to any computer system that includes one or more I/O slots, where I/O adapters are not being used for extended periods of time and the I/O slots advantageously are powered off in accordance with features of the preferred embodiment.

Figure 2:
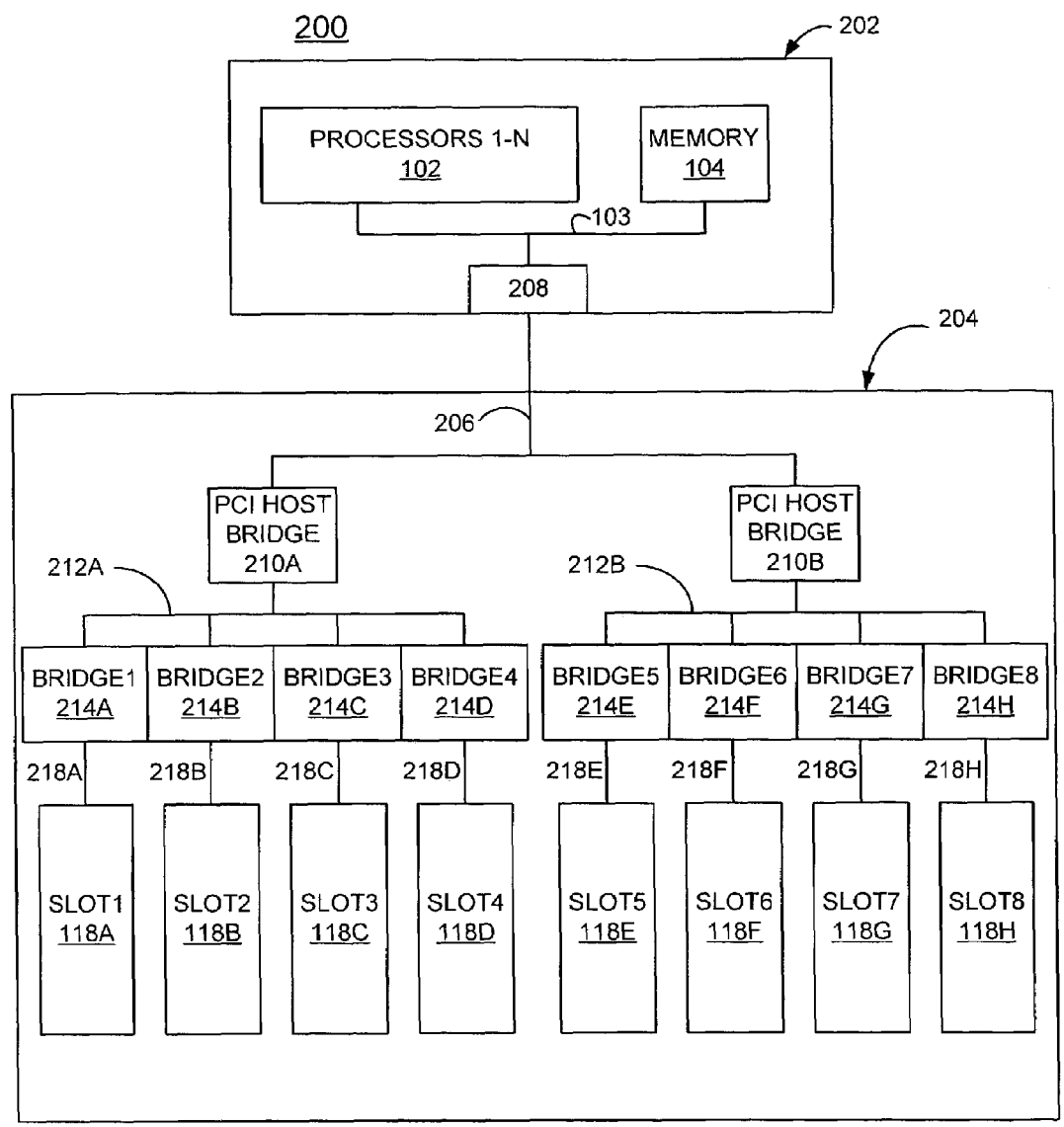
FIGS. 2 and 3 are block diagrams respectively illustrating one exemplary hardware implementation and one exemplary logically partitioned software implementation that may be used in the computer system of FIG. 1 in accordance with the preferred embodiment.

Referring now to FIG. 2, there is shown an exemplary hardware arrangement generally designated by 200 of the computer system 100 including, for example, a first enclosure 202 containing the processors 1-N, 102 and memory 104 coupled together by the system bus 103. A second enclosure 204 contains I/O components coupled to a bus 206 that is coupled to the system bus 103 via a bus interface 208 within the first enclosure 202. As shown, a pair of PCI host bridges 210A, 210B coupled to bus 206 respectively connect the processors 1-N, 102 and memory 104 to a pair of primary peripheral component interconnect (PCI) buses 212A, 212B. Each of the PCI host bridges 210A, 210B provides an interface to four PCI to PCI bridges, 1-4, 214A-214D, and 5-8, 214E-214H connected via the primary PCI buses 212A, 212B. A respective one of the PCI to PCI bridges 1-8, 214A-214H is connected to a PCI slot 1-8, 118A-118H via a respective secondary PCI bus 218A-218H.

Figure 3:
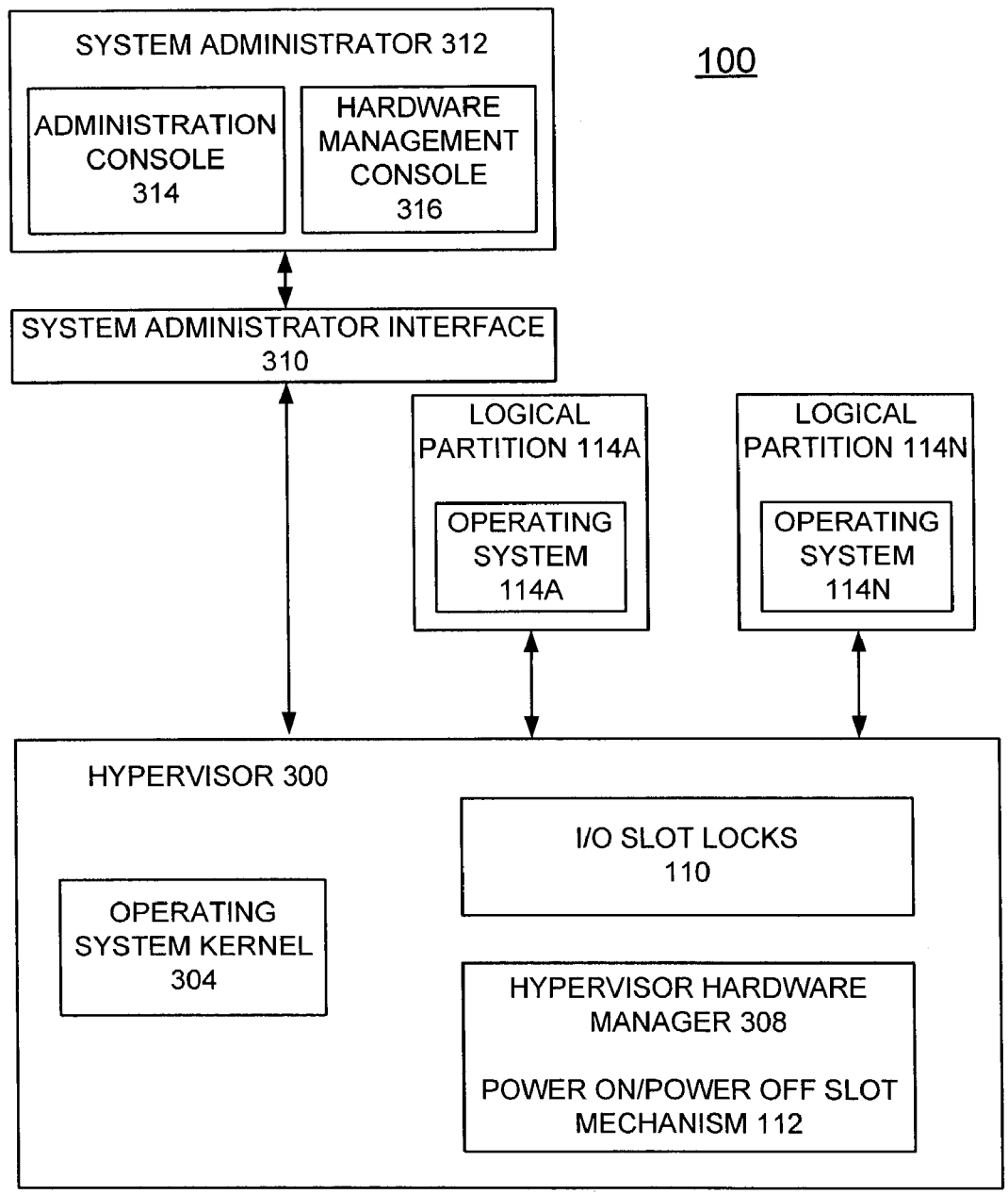

Referring now to FIG. 3, there is shown an exemplary software arrangement of the computer system 100 including a hypervisor 300 for implementing methods for detecting and powering off unused I/O slots in accordance with the preferred embodiment. The hypervisor 300 controls the run-time partitioned environment and implements functions of resource and partition manager 106 of FIG. 1. As shown in FIG. 3, hypervisor 300 includes an operating system kernel 304.

Hypervisor 300 includes a hypervisor hardware manager 308 that encapsulates hypervisor functions to access and control hardware states of the PCI adapter slots 1-8, 118A-118H including power on/power off slot mechanism 112. The I/O slot lock mechanism 108 encapsulate the functions to set the ownership of the slot lock 110 and to serialize transfer of a slot lock between hypervisor 300 and logical partitions 114A-114N. Logical partitions 114A-114N communicate with the hypervisor 300 to invoke hypervisor functions. Hypervisor 300 is an agent of a system administrator interface 310, and performs partition configuration and platform service operations requested by the system administrator 312 through interface 310. System administrator 312 includes an administration console 314 and a hardware console 316.

Figure 4:
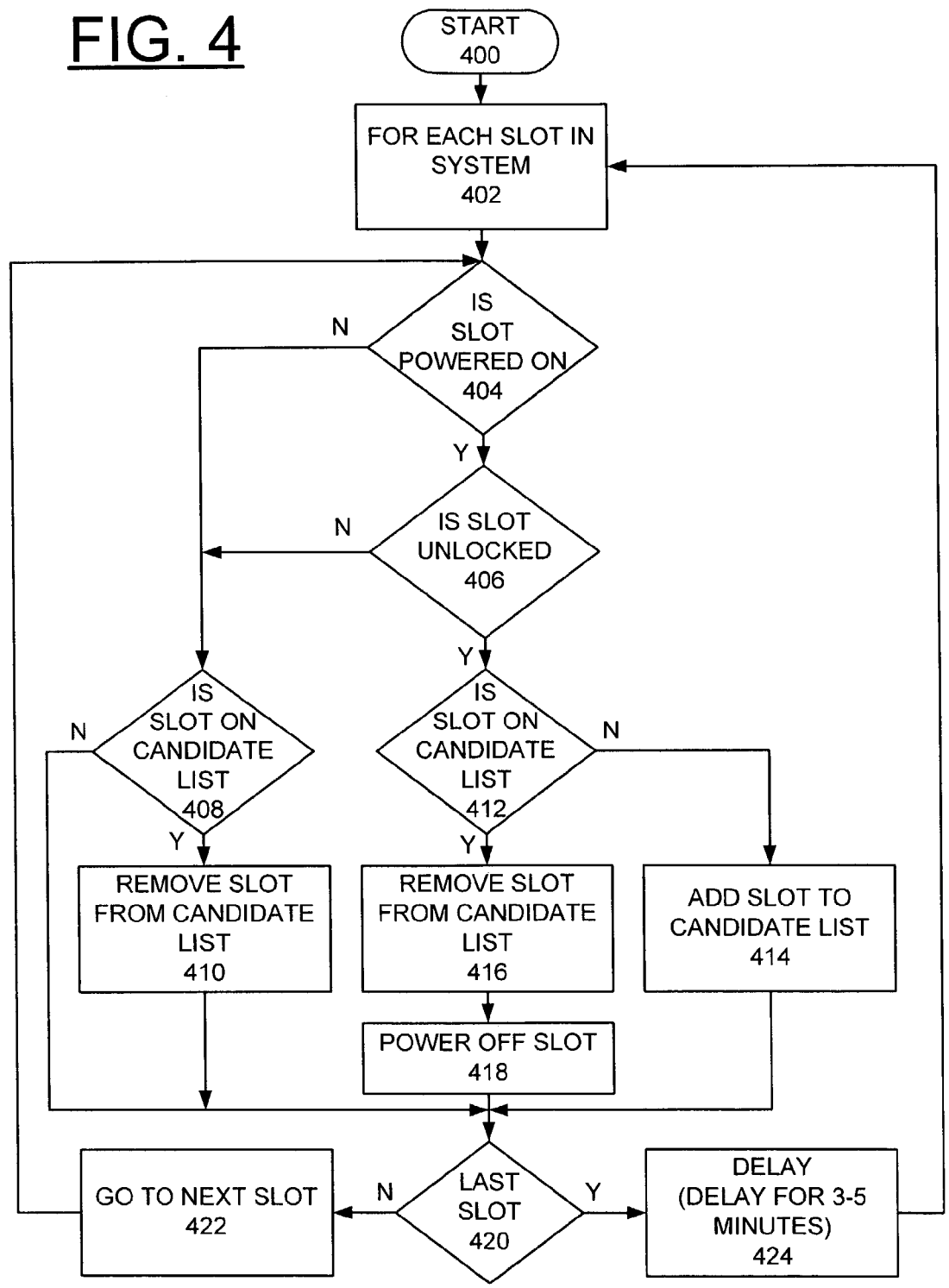
FIG. 4 is a flow chart illustrating exemplary steps performed by the logically partitioned computer system of FIG. 1 for implementing methods for detecting and powering off unused I/O slots in accordance with the preferred embodiment.

Hypervisor operating system kernel 304 includes a task for implementing methods for detecting and powering off unused I/O slots in accordance with the preferred embodiment as illustrated and described in FIG. 4.

It should be understood that the present invention is not limited for use with the illustrated computer system 100, hardware arrangement 200 or hypervisor 300. The illustrated computer system 100, hardware arrangement 200 and hypervisor 300 are not intended to imply architectural or operating system limitations. The present invention can be used with various computer systems having a plurality of I/O slots and various other internal hardware or peripheral devices. For example, computer system 100 may contain multiple buses, rather than the single system bus 103 shown in FIG. 1, and other bus architectures than the illustrated PCI bus architecture of FIG. 2 may be used. While eight PCI I/O slots 1-8, 118A-118H are shown in FIG. 2, it should be understood that the present invention is not limited to use with PCI I/O slots or a particular number of I/O slots.

In accordance with features of the preferred embodiment, the method involves continuously iterating through all I/O slots 118 in the system 100 looking for slots that are powered on but not being used. For example, determining whether a slot is being used or not is done based on the status of the slot lock associated with the slot. If the slot lock for a slot is not held, the slot is considered unused. There are periods of time when I/O adapters or slots 118 in the logically partitioned system 100 are not being used and are powered off by the method of the preferred embodiment. Then when I/O slots 118 are needed the slots are powered on again.

In accordance with features of the preferred embodiment, to ensure unused slots 118 are powered off, a hypervisor task in hypervisor operating system kernel 304 is started at platform initial program load (IPL) and runs continuously while the hypervisor 300 is active; that is, the hypervisor task exists until the hypervisor 300 is terminated typically at platform power off or reboot.

For example, consider the logically partitioned system 200 with eight I/O slots, 1-8, 118A-118H, that are occupied and may be contained in a single I/O expansion unit or enclosure 204. I/O slots 1-4, 118A-118D are assigned to partition 1, 114, which is powered on. I/O slots 5-7 118E-118G are assigned to partition 2, 114, which is powered off. I/O slot 8, 118H is not assigned to a partition. At some point while the platform is up and running, the enclosure 204 in which I/O slots 1-8 118A-118H reside goes through a power-on-reset (POR). The POR could be the result of one of multiple events. Temporary loss and restoration of A/C power would cause a POR, as would happen if the power cord accidentally got pulled out and re-inserted, or electricity temporarily is interrupted and restored. A concurrent maintenance procedure on the enclosure 204 would also cause a POR, such as a concurrent repair action where the hardware management console is used to power off the enclosure, a part is replaced, and the hardware management console is used to power on the enclosure again. When the enclosure 204 goes through the POR, all contained I/O slots 1-8, 118A-118H are powered on automatically by the hardware.

Hypervisor task of hypervisor operating system kernel 304 of the preferred embodiment that started at hypervisor IPL and runs continuously while the hypervisor 300 is powered on, is continuously looking for any of the I/O slots 1-8, 118A-118H that are not needed and can be powered off, such as slots 5-8 118E-118H in the above example. The task uses a hypervisor interface, such as power on/power off slot mechanism 112 to determine whether a slot is powered on and to power off an unused slot. The task determines whether a slot is needed based on whether the slot lock 110 for a slot is held or not. The slot lock 110 is a mechanism used to ensure an entity accessing a particular one of slots 1-8, 118A-118H is authorized to do so, as well as to serve as a synchronization point for resetting the slot and disabling memory and other mappings associated with the slot during a dynamic transfer of the slot between partitions 1-N, 114A-114N. In other words, before an entity, such as a partition 1-N, 114A-114N or an external service agent such as hardware management console 316, is allowed to access a particular I/O slot 1-8, 118A-118H through hypervisor controls associated with the slot, the entity must hold the slot look 110 for the slot. If the slot lock 110 associated with a slot 1–8, 118A–118H is not held or the slot is not locked, the slot is not being used. Thus, the hypervisor task of the preferred embodiment considers an I/O slot 1–8, 118A–118H that is powered on, but for which the lock is not held, a candidate for power off.

In accordance with features of the preferred embodiment, to prevent repeated power cycles of I/O slots in quick succession during enclosure concurrent maintenance procedures and procedures involving the dynamic transfer of a slot between partitions (LPAR), which can be detrimental to some I/O adapters, the hypervisor task of the preferred embodiment does not immediately power off a slot upon detecting the slot lock not held. Rather, the hypervisor task records the fact that the slot was found to be a candidate for power off and continues iterating through slots in the system. When the hypervisor task of the preferred embodiment has finished iteration through all I/O slots 1–8, 118A–118H in the system 100, recording those that are candidates for power off, it delays for a short time after which it begins another iteration through the slots. Each slot that is found to be a candidate for power off, that was also recorded as a candidate the previous iteration through the slots, is powered off and the candidate status cleared. When a slot is encountered that was recorded as a candidate for power off during the previous iteration through the slots, the candidate status is cleared regardless of whether the slot is still a candidate or not, so that the next time the slot is found to be a candidate for power off the slot does not appear as though the slot was found to be a candidate during the previous iteration. This ensures the proper delay occurs before the slot is actually powered off so as to not power off a slot that is about to be locked, which could cause slot power cycles in quick succession.

Referring now to FIG. 4, there are shown exemplary steps performed by the hypervisor task for implementing methods for detecting and powering off unused I/O slots 118 in the logically partitioned computer system 100 in accordance with the preferred embodiment starting at a block 400. As indicated in a block 402, for each slot 118 in the system 100, checking is performed to determine if the current slot is powered on as indicated in a decision block 404. When the current slot is powered on, checking is performed to determine if the slot is unlocked as indicated in a decision block 406. If the current slot is not powered on or if the slot is locked, then checking is performed to determine if the slot is on the candidate list as indicated in a decision block 408. If the slot is on the candidate list, the slot is removed from the candidate list as indicated in a block 410. If determined at decision block 406 that the slot is unlocked, then checking is performed to determine if the slot is on the candidate list as indicated in a decision block 412. If the slot is not on the candidate list, the slot is added to the candidate list as indicated in a block 414. If the slot is on the candidate list, the slot is removed from the candidate list as indicated in a block 416. Then the slot is locked to gain access to the slot and the slot is powered off as indicated in a block 418. Checking whether the current slot is the last slot is performed as indicated in a decision block 420. When the current slot is not the last slot, then the next slot is accessed as indicated in a block 422. When the current slot is the last slot, then a delay, for example a delay of 3–5 minutes, is provided as indicated in a block 424. Then the sequential steps return to block 402 and are repeated iterating thought each slot 118 in the system 100.

It should be understood that variations of the exemplary steps of FIG. 4 are within the scope of the present invention. For example, one variation of the illustrated exemplary steps would be to insert a proper delay immediately upon detecting a slot that is a candidate for power off, rather than recording the fact that the slot was a candidate and not powering off the slot until it is determined to still be a candidate during the next iteration through the slots. The illustrated implementation of FIG. 4 is considered preferable because it appears more orderly to an observer and executes the delays in parallel resulting in unused slots being powered off sooner when a set of related slots become candidates for power off as a group, such as might occur when an enclosure, such as enclosure 204 is powered off and then back on. Another variation would be to omit the delay altogether and allow the possibility that slots are power cycled in quick succession, and the resulting detrimental effects to the adapters contained therein.

Figure 5:
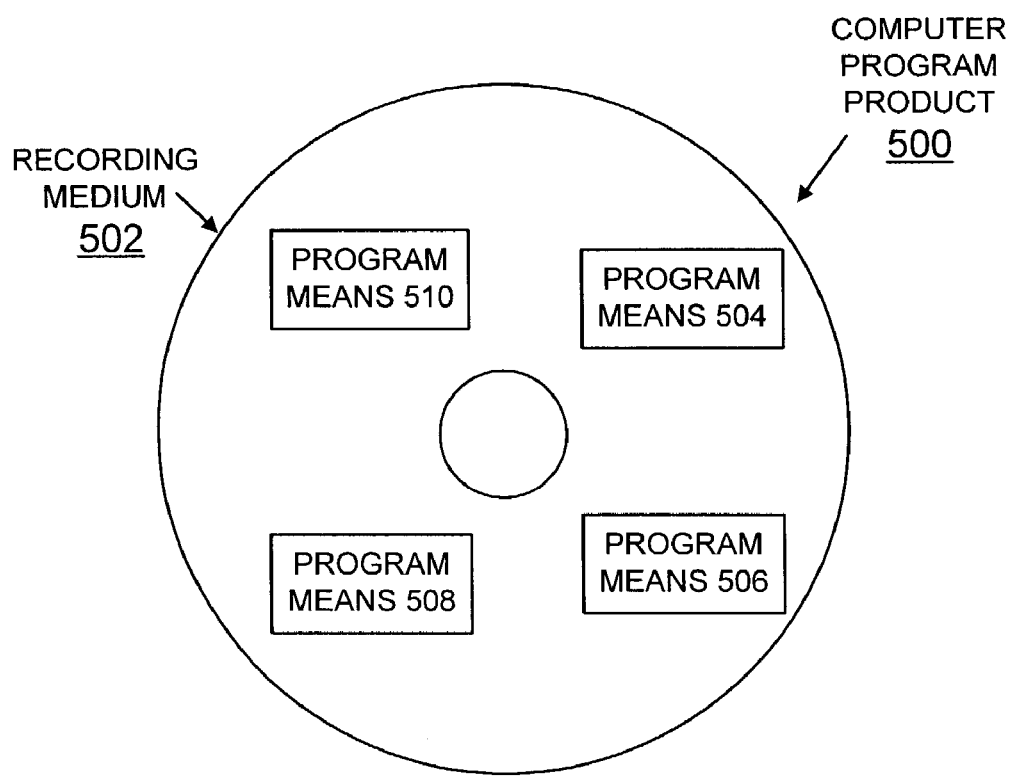
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for detecting and powering off unused I/O slots of the preferred embodiment in the system 100 of FIG. 1.

A sequence of program instructions or a logical assembly of one or more interrelated modules defined by the recorded program means 504, 506, 508, 510, direct the computer system 100 for detecting and powering off unused I/O slots of the preferred embodiment.

While the present invention has been described with reference to the details of the embodiments of the invention shown in the drawing, these details are not intended to limit the scope of the invention as claimed in the appended claims.

What is claimed is:

1. A method for detecting and powering off unused input/output (I/O) slots in a computer system including a logically partitioned computer system comprising the steps of:

for each of the I/O slots, checking if a current slot is powered on;

responsive to the current slot being powered on, checking if the current slot is unlocked;

responsive to the current slot being unlocked, checking if the current slot is a candidate for being powered off, responsive to the current slot being unlocked and being said candidate for being powered off, powering off the current slot; and continuing with a next one of the I/O slots as the current slot.

2. A method for detecting and powering off unused I/O slots as recited in claim 1 wherein the step of powering off the current slot includes removing the current slot from being said candidate for being powered off.

3. A method for detecting and powering off unused I/O slots as recited in claim 1 includes the steps responsive to the current slot not being powered on, of checking if the current slot is a candidate for being powered off.

4. A method for detecting and powering off unused I/O slots as recited in claim 3 includes the steps responsive to the current slot not being said candidate for being powered off, checking if the current slot is the last slot; and responsive to the current slot not being the last slot of continuing with a next slot.

5. A method for detecting and powering off unused I/O slots as recited in claim 3 includes the steps responsive to the current slot being said candidate for being powered off, of removing the current slot from being said candidate for being powered off; checking if the current slot is the last slot; and responsive to the current slot not being the last slot of going to a next slot.

6. A method for detecting and powering off unused I/O slots as recited in claim 1 includes the steps responsive to the current slot being locked, of checking if the current slot is a candidate for being powered off.

7. A method for detecting and powering off unused I/O slots as recited in claim 6 includes the steps responsive to the current slot being said candidate for being powered off, of removing the current slot from being said candidate for being powered off; checking if the current slot is the last slot; and responsive to the current slot not being the last slot of going to a next slot.

8. A method for detecting and powering off unused I/O slots as recited in claim 1 includes the steps responsive to the current slot being powered on and unlocked and not being said candidate for being powered off, of adding the current slot as said candidate for being powered off; checking if the current slot is the last slot; and responsive to the current slot not being the last slot of going to a next slot.

9. A method for detecting and powering off unused I/O slots as recited in claim 1 includes the steps of identifying the current slot as being a last one of the I/O slots, providing a delay, and then sequentially repeating the checking steps for each of the I/O slots.

10. A computer program product for implementing detecting and powering off unused input/output (I/O) slots in a computer system including a logically partitioned computer system, said computer program product including instructions executed by the computer system to cause the computer system to perform the steps of:
for each of the I/O slots, checking if a current slot is powered on;
responsive to the current slot being powered on, checking if the current slot is unlocked;
responsive to the current slot being unlocked, checking if the current slot is a candidate for being powered off;
responsive to the current slot being unlocked and not being said candidate for being powered off, recording the current slot as a candidate for being powered off;
responsive to the current slot being unlocked and being said candidate for being powered off, powering off the current slot; and
continuing with a next one of the I/O slots as the current slot.

11. A computer program product for implementing detecting and powering off unused I/O slots as recited in claim 10 wherein said instructions further cause the computer system to perform the steps responsive to the current slot not being powered on, of checking if the current slot is a candidate for being powered off; and responsive to the current slot being said candidate for being powered off, removing the current slot from being said candidate for being powered off.

12. A computer program product for implementing detecting and powering off unused I/O slots as recited in claim 10 wherein said instructions further cause the computer system to perform the steps responsive to the current slot being locked, checking if the current slot is a candidate for being powered off, and responsive to the current slot being said candidate for being powered off, removing the current slot from being said candidate for being powered off.

13. A computer program product for implementing detecting and powering off unused I/O slots as recited in claim 10 wherein said instructions further cause the computer system to perform the steps of identifying the current slot as being a last one of the I/O slots, providing a delay, and then sequentially repeating the checking steps for each of the I/O slots.

14. A computer program product for implementing detecting and powering off unused input/output (I/O) slots as recited in claim 10 wherein step of powering off the current slot includes removing the current slot from being said candidate for being powered off.

15. Apparatus for detecting and powering off unused input/output (I/O) slots in a computer system including a logically partitioned computer system comprising:
a plurality of I/O slots;
a slot lock mechanism for authorizing defined entities exclusive access to one or more of the I/O slots and locking said one or more of the I/O slots and for unlocking an unused I/O slot;
a power on and power off slot mechanism for powering on the I/O slots and for selectively powering off one or more of the I/O slots;
an operating system kernel task performing, for each of the I/O slots, the steps of, checking if a current slot is powered on;
responsive to the current slot being powered on, checking if the current slot is unlocked;
responsive to the current slot being unlocked, checking if the current slot is a candidate for being powered off,
responsive to the current slot being unlocked and not being said candidate for being powered off, recording the current slot as a candidate for being powered off;
responsive to the current slot being unlocked and being said candidate for being powered off, powering off the current slot; and
continuing with a next one of the I/O slots as the current slot.

16. Apparatus for detecting and powering off unused I/O slots as recited in claim 15 wherein said operating system kernel task further performs the steps of identifying the current slot as being a last one of the I/O slots, providing a set delay, and then sequentially repeating the checking steps for each of the I/O slots.

17. Apparatus for detecting and powering off unused I/O slots as recited in claim 15 wherein said operating system kernel task further performs the steps responsive to the current slot not being powered on, of checking if the current slot is a candidate for being powered off; and responsive to the current slot being said candidate for being powered off, removing the current slot from being said candidate for being powered off.

18. Apparatus for detecting and powering off unused I/O slots as recited in claim 15 wherein said operating system kernel task further performs the steps responsive to the current slot being locked, of checking if the current slot is a candidate for being powered off, and responsive to the current slot being said candidate for being powered off, removing the current slot from being said candidate for being powered off.

* * * * *